United States Patent
Schief et al.

(10) Patent No.: US 7,504,143 B2
(45) Date of Patent: Mar. 17, 2009

(54) MULTILAYER PLANAR OR TUBULAR FOOD CASING OR FILM

(75) Inventors: Hermann-Josef Schief, Rheinbach (DE); Jürgen Michael Schiffman, Hennef-Rott (DE)

(73) Assignee: Kuhne Anlangenbau GmbH, St. Augustin (DE)

( * ) Notice: Subject to any disclaimer, the term of this patent is extended or adjusted under 35 U.S.C. 154(b) by 510 days.

(21) Appl. No.: 10/518,412

(22) PCT Filed: Jun. 6, 2003

(86) PCT No.: PCT/EP03/05985

§ 371 (c)(1),
(2), (4) Date: Jul. 11, 2005

(87) PCT Pub. No.: WO04/000026

PCT Pub. Date: Dec. 31, 2003

(65) Prior Publication Data

US 2005/0244553 A1    Nov. 3, 2005

(30) Foreign Application Priority Data

Jun. 20, 2002    (DE) ............................. 102 27 580

(51) Int. Cl.
*B29D 22/00*    (2006.01)
*B29D 23/00*    (2006.01)
*B32B 1/08*    (2006.01)

(52) U.S. Cl. .................... 428/36.7; 428/36.6; 428/35.7; 428/34.8; 428/475.5; 428/474.4; 428/475.8

(58) Field of Classification Search ............. 428/474.4, 428/475.5, 475.8, 35.7, 36.6, 36.7, 36.9, 428/36.91, 34.9, 34.8

See application file for complete search history.

(56) References Cited

U.S. PATENT DOCUMENTS

| | | | |
|---|---|---|---|
| 5,595,623 A * | 1/1997 | Lulham et al. | 156/244.14 |
| 5,972,444 A | 10/1999 | Patel et al. | |
| 6,177,159 B1 * | 1/2001 | Tajiri et al. | 428/35.7 |
| 6,291,041 B1 | 9/2001 | Howells et al. | |
| 6,541,087 B1 * | 4/2003 | Pophusen et al. | 428/36.7 |

FOREIGN PATENT DOCUMENTS

| DE | 40 17 046 A1 | 11/1991 |
|---|---|---|
| EP | 1 290 948 A1 | 3/2003 |
| WO | WO 02/26494 A2 * | 4/2002 |

* cited by examiner

*Primary Examiner*—Michael C Miggins
(74) *Attorney, Agent, or Firm*—The Nath Law Group; Derek Richmond; Sung Yeop Chung

(57) ABSTRACT

The present invention provides novel multilayered plane or tubular food package casings or films for foodstuff packages, such as sausage casings or the like, having a lamination structure of at least six, preferably at least seven layers.

8 Claims, No Drawings

MULTILAYER PLANAR OR TUBULAR FOOD CASING OR FILM

The present invention refers to a plane or tubular, multilayered food package casing or film for foodstuff packages, such as sausage casings, shrink bags and so on, according to the preamble of claim 1 or according to the preamble of claim 2.

From DE 3212343 A1 a tubular package casing made of a two-layered film laminate is known.

Furthermore, DE 4017046 A1 and EP 0467039 A2 discuss a polyamide-based, tubular, multilayered package casing for pasty packaged goods, more particularly an artificial sausage casing.

In practice, such sausage casings or artificial sausage skins are used for packaging sausages or pasty goods. The product to be packed, e.g. sausage meat or emulsion, is filled into said artificial skin, and then is scalded, cooled and stored therein. This requires, among others, considerable dimensional stability throughout the entire manufacturing process, as well as sufficient protection of the packaged goods against exterior detrimental effects, such as by oxygen ingress, UV radiation, dry out and so on.

Generally, three types of conventional sausage casings that are commonly used can be classified: the traditional single-layered sausage casing made of polyamide, whose essential drawback is the absence of a barrier against water vapor. The wide-spread used three-layered sausage casing comprising, in order from outside to inside, polyamide, polyolefin, preferably polyethylene, polyamide. Here, the central polyolefin layer constitutes the barrier against water vapor, that is absent in the single-layered sausage casing. The inner polyamide layer provides for satisfactory sausage meat adhesion and prevents jelly cook-out or deposition. In this regard, the polyamide layer can be substituted by an appropriately (corona) pretreated PE layer, the PE layer, in the latter case, would then have to be modified to form a satisfactory bond with PA. In recent years, five-layered sausage casings have thoroughly tested under practical conditions, Said layers, in order from outside to inside, comprise PA, adhesion agent, PE, adhesion agent, and finally again PA. This structure corresponds basically to the three-layered sausage casing, but it comprises a separate bonding layer or adhesion agent between PA and PE or PE and PA, respectively. Therefore, a greater number of variations with regard to the raw materials or mixtures used for the central polyolefin layer become possible.

The mechanical properties, however, such as maximum shrink rate or over-stretch factor obtainable, e.g. for mono- or bidirectional stretching, of these practically known plane or tubular multilayered food package casings or films are still not satisfactory. This is in large part due to the fact that they are still not able to provide barriers against oxygen and vapor steam, respectively, that would prove satisfactorily impervious.

Therefore, it is an object of the present invention to overcome the disadvantages mentioned above and to advantageously develop a generic plane or tubular multilayered food package casing or film that is adapted to provide a barrier with adequate imperviousness against oxygen together with a satisfactory shrink rate and an acceptable overstretch factor.

This object is achieved by the features of claim 1 and claim 2.

According to the present invention, a plane or tubular food package casing or film for foodstuff packages, e.g. sausage casings or the like, is disclosed for the first time, having a novel lamination structure comprising at least six, preferably at least seven, layers, as listed below:

a) the first layer, in order from outside to inside, comprising, as a layer constituent, polyamide, the second layer, in order from outside to inside, comprising, as a layer constituent, EVOH, the third layer, in order from outside to inside, comprising, as a layer constituent, an adhesion agent, the fourth layer, in order from outside to inside, comprising, as a layer constituent, a polyolefin, preferably polyethylene, the fifth layer, in order from outside to inside, comprising, as a layer constituent, an adhesion agent, and the sixth layer, in order from outside to inside, that faces the food to be packaged, comprising, as a layer constituent, polyamide, or b) the first layer, in order from outside to inside, comprising, as a layer constituent, polyamide, the second layer, in order from outside to inside, comprising, as a layer constituent, EVOH, the third layer, in order from outside to inside, comprising, as a layer constituent, polyamide, the fourth layer, in order from outside to inside, comprising, as a layer constituent, polyethylene, the sixth layer, in order from outside to inside, comprising, as a layer constituent, an adhesion agent, and the seventh layer, in order from outside to inside, that is the layer facing the food to be packaged, comprising, as a layer constituent, polyamide, or c) the first layer, in order from outside to inside, comprising, as a layer constituent, polyamide, the second layer, in order from outside to inside, comprising, as a layer constituent, an adhesion agent, the third layer, in order from outside to inside, comprising, as a layer constituent, polyamide, the fourth layer, in order from outside to inside, comprising, as a layer constituent, EVOH, the fifth layer, in order from outside to inside, comprising, as a layer constituent, polyamide, the sixth layer, in order from outside to inside, comprising, as a layer constituent, an adhesion agent, and the seventh layer, in order from outside to inside, that is the layer facing towards the food to be packaged, comprising, as a layer constituent, polyamide.

Furthermore, the present invention proposes a plane or tubular food package casing or film for the packaging of food stuff, such as shrink bags or the like, whose novel lamination structure, in order from outside to inside, comprises at least seven layers. In this lamination structure:

a) the first layer, in order from outside to inside, comprises, as a layer constituent, a polyolefin, preferably polyethylene, the second layer, in order from outside to inside, comprises, as a layer constituent, an adhesion agent, the third layer, in order from outside to inside, comprises, as a layer constituent, polyamide, the fourth layer, in order from outside to inside, comprises, as a layer constituent, EVOH, the fifth layer, in order from outside to inside, comprises, as a layer constituent, polyamide, the sixth layer, in order from outside to inside, comprises, as a layer constituent, an adhesion agent, and the seventh layer, in order from outside to inside, comprises, as a layer constituent, a polyolefin, preferably polyethylene, or b) the first layer, in order from outside to inside, comprises, as a layer constituent, PET, the second layer, in order from outside to inside, comprises, as a layer constituent, an adhesion agent, the third layer, in order from outside to inside, comprises, as a layer constituent, polyamide, the fourth layer, in order from outside to inside, comprises, as a layer constituent, EVOH, the fifth layer, in order from outside to inside, comprises, as a layer constituent, polyamide, the sixth layer, in order from outside to inside, comprises, as a layer constituent, an adhesion agent, the seventh layer, in order from outside to inside, comprises, as a layer constituent, polyolefin, preferably polyethylene, or c) the first layer, in order from outside to inside, comprises, as a layer constituent, polyolefin, preferably polyethylene, the second layer, in order from outside to inside, comprises, as a layer constituent, EVA, the third layer, in order from outside to inside, comprises, as a layer constituent, an adhesion agent, the fourth layer, in order from outside to inside, comprises, as a layer constituent, EVOH, the fifth layer, in order from outside to inside, comprises, as a layer constituent, an adhesion agent, the sixth layer, in order from outside to inside, comprises, as a layer constituent, EVA, the seventh layer, in order from outside to inside, comprises, as a layer constituent, a polyolefin, preferably polyethylene.

In this regard, EVOH advantageously provides for the desired barrier. The PA makes it possible to guarantee the desired mechanical properties. PE enables a positive effect on the sealing properties. Furthermore, EVA enables achievement of high shrink together with a further control of the mechanical properties, in which case an additional electron beam treatment has to be provided.

In this application, the term polyolefins encloses PE and EVA, as well as mixtures of polyolefins as such and polyolefin-ionomer mixtures. The adhesion agents (short: HVs) constitute an adhesion layer. The term EVOH encloses EVOH as well as mixtures of EVOH with other polymers. Furthermore, PA generally represents PA and PA 6, PA66, PA 6/66, PA 6/12 or the like and mixtures thereof, as well as mixtures of PA and other polymers. Furthermore, EVA represents EVA as well as EVA-polymer mixtures.

Thus, a food package casing or film for foodstuff packages, especially sausage casings, is advantageously achieved, appropriately enabling a controlled shrink of at least 10 to 20%, preferably at least 12 to 15%.

Especially for shrink bags or the like, said proposed lamination structures can provide a particularly high shrink of at least 20% to 60%, preferably at least 30% to 50%, at a water temperature of about 95° C.

The overstretch factor that is simultaneously achievable as a result of the above is at least 5 to 15%, preferably 10 to 12%, for sausage casings and shrink bags, respectively.

With regard to the sealing layer that has to be provided on the inner or outer side of shrink bags, a polyolefin, preferably PE, LLDPE, EVA, among others, or ionomers or mixtures thereof can be provided in said novel proposed laminate structures.

The food package casing or film is especially suited as e.g. a sausage casing, because the innermost layer of its novel proposed laminate structures exhibits superior sausage meat adhesion.

The superior oxygen barrier provided by the EVOH layer component guarantees a very good storage stability of the foodstuff packaged, especially of sausage meat contained in a sausage casing for more than six weeks, without any quality loss.

Due to the extremely effective oxygen layer, a novel foodstuff package casing or film can be obtained, constituting a packaging for foodstuff, which will prevent oxygen ingress-induced discoloring or even aging or flavor loss of goods otherwise extremely susceptible to oxygen.

In a preferred lamination structure, the EVOH layer component is sandwiched between two layers comprising polyamide as a layer component, which results in a very strong oxygen barrier and, at the same time, a very good embedding and stabilization of the EVOH layer between said two polyamide layers acting as carrier layers.

At the same time, a superior barrier against water vapor is provided, which is critical especially for sausages or other foodstuff requiring preservation. As a result, foodstuff packaged with the food package casing or film according to the present invention remain fresh over long periods of time.

As a result of the low permeability for water vapor, weight losses of food-stuff and especially of sausages under storage conditions are very low. Especially sausages that have been packaged with the sausage casing according to the invention, show a crease-less, tight-fit casing even after long-time storage. Due to the superior meat adhesion, no voids, into which sausage meat jelly could cook out, arise between the innermost layer of the sausage casing and the sausage emulsion, Furthermore, the food package casing or film is useful as a shrink bag and provides for a good sealing when bonded. In case the shrink bag according to the invention is used as a sausage casing, mere bonding is possible, too.

The outermost layer of the food package casing or film proposed for the first time herein can readily be labeled or printed.

Furthermore, the food package casing or film of the present invention is especially suited for manufacture and processing with the appropriate equipment provided by the present applicant.

Further advantageous embodiments of the invention can be seen form the features of the subclaims.

Thus, in a preferred embodiment of the present invention, the food package casing or film for packaging foodstuff is designed to include layers comprising as layer constituents polypropylene or polyolefin, or, alternatively, polypropylene, EVA (ethyl vinyl alcohol), EM(M)A, among others, ionomers or mixtures thereof.

Furthermore, in a preferred embodiment, the layers including an adhesion agent are designed to include an adhesion agent on the basis of PE, EVA, EM(M)A or a ionomer as basic component.

According to a further preferred embodiment, layers comprising, as a layer constituent, an adhesive agent are designed to alternatively comprise a mixture of polyolefin and adhesive agent or a mixture of EVA and/or EM(M)A and adhesive agent.

According to a still further preferred embodiment, layers comprising, as a layer constituent, EVOH are designed to alternatively comprise a ionomer.

Furthermore, in a preferred embodiment, layers comprising, as a layer constituent, polyamide are designed to alternatively comprise MXD6.

According to a preferred embodiment layers comprising, as a layer constituent, polyamide are designed to include, among others, polycaprolactam (PA 6), polyhexamethylene adipinarnide (PA 66), PA 6/66, PA 11, PA12 or mixtures of these polyamides.

The present invention, for the first time, proposes a plane or tubular food package casing or film comprising, as a layer constituent, a lamination structure with at least six, preferably at least seven, layers.

The invention claimed is:

1. Multilayered tubular food package casing or film for sausage casings, characterized by the following lamination structure in order from outside to inside:

a)
the first layer, in order from outside to inside, comprising polyamide as a layer constituent;
the second layer, in order from outside to inside, comprising EVOH as a layer constituent;

the third layer, in order from outside to inside, comprising an adhesion agent as a layer constituent;

the fourth layer, in order from outside to inside, comprising polyolefin as a layer constituent;

the fifth layer, in order from outside to inside, comprising an adhesion agent as a layer constituent; and the sixth layer, in order from outside to inside, comprising polyamide as a layer constituent;

or c)

the first layer, in order from outside to inside, comprising polyamide as a layer constituent;

the second layer, in order from outside to inside, comprising an adhesion agent as a layer constituent;

the third layer, in order from outside to inside, comprising polyamide as a layer constituent;

the fourth layer, in order from outside to inside, comprising EVOH as a layer constituent;

the fifth layer, in order from outside to inside, comprising polyamide as a layer constituent;

the sixth layer, in order from outside to inside, comprising an adhesion agent as a layer constituent; and the seventh layer, in order from outside to inside, comprising polyamide as a layer constituent.

2. Multilayered tubular food package casing or film for sausage casings according to claim 1,
wherein at least one of said layers comprising polyolefin as a layer constituent comprises at least one polyolefin selected from the group consisting of: polypropylene, EVA (ethyl vinyl alcohol) EM(M)A, ionomers and combinations thereof.

3. Multilayered tubular food package casing or film for sausage casings according to claim 1,
wherein at least one of said layers comprising an adhesion agent comprises an adhesion agent on the basis of PE, EVA, EM(M)A or a ionomer as basic component.

4. Multilayered tubular food package casing or film for sausage casings according to claim 1,
wherein at least one of said layers comprising an adhesion agent as a layer constituent comprises a mixture of polyolefin and adhesion agent or a mixture of EVA and/or EM(IM)A and adhesion agent.

5. Multilayered tubular food package casing or film for sausage casings according to claim 1,
wherein at least one of said layers comprising or consisting of polyamide as a layer constituent comprises MXD6.

6. Multilayered tubular food package casing or film for sausage casings according to claim 1,
wherein at least one of said layers comprising polyamide as a layer constituent comprises at least one polyamide selected from the group consisting of: polycaprolactam (PA 6), polyhexamethylene adipamide (PA 66), PA 6/66, PA 11, PA 12, and combinations thereof.

7. Multilayered tubular food package easing or film for sausage casings according to claim 1,
wherein at least one of said layers comprising polyolefin as a layer constituent comprises polyethylene.

8. A sausage casing comprising the multilayered tubular food package casing or film of claim 1.

* * * * *